Figure 1:
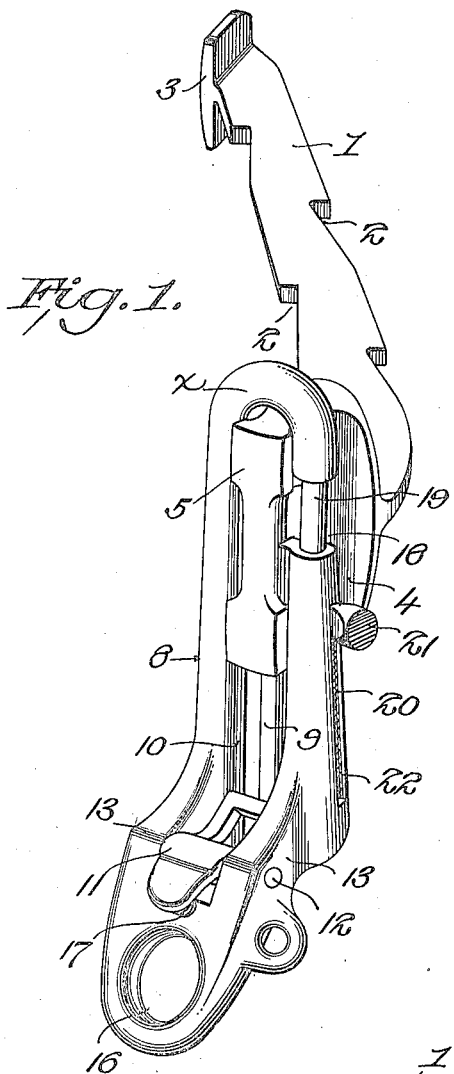

Mar. 27, 1923.

B. KUGLER 1,449,516

COMBINED CATCH AND SLIDE ANCHORAGE AND TERMINAL COUPLING FOR
WINDOW CLEANERS' HARNESS
Filed May 24, 1922

Inventor
Benjamin Kugler,
By Cutterly & Kessenich.
Attorneys

Patented Mar. 27, 1923.

1,449,516

UNITED STATES PATENT OFFICE.

BENJAMIN KUGLER, OF CHICAGO, ILLINOIS.

COMBINED CATCH AND SLIDE ANCHORAGE AND TERMINAL COUPLING FOR WINDOW-CLEANERS' HARNESS.

Application filed May 24, 1922. Serial No. 563,460.

*To all whom it may concern:*

Be it known that I, BENJAMIN KUGLER, a citizen of the United States, residing at Chicago, in the county of Cook and State of Illinois, have invented new and useful Improvements in Combined Catches and Slide Anchorages and Terminal Couplings for Window-Cleaners' Harness, of which the following is a specification.

My invention relates, in general terms, to improvements in couplings and anchoring devices complementary thereto for attaching the harness used by window cleaners and others to a suitable base; and more particularly the present embodiment of my invention is designed to provide an anchorage adapted for use with either a "slide" coupling or a "catch" or "hook" coupling, and a terminal coupling for use in conjunction with the above anchorage which may be attached thereto with a sliding movement and locked, or hooked and locked depending upon the particular duty which it is to perform, or the type of harness used.

Ordinarily a coupling which is attached to an anchorage with a sliding movement is incapable of the swivel or free action of a coupling which is hooked to an anchorage. While a fixed coupling is desirable in many instances, circumstances often arise which necessitate a freer action of the coupling with respect to the anchorage, and to this end I have devised complementary couplings and anchors which embody facilities for attaining either object. It is pointed out, by way of illustration, that a "catch" or "hook" coupling will permit of wider range of use of a window cleaners' harness, while a "slide" coupling is generally more desirable where the harness is subjected to an excessive load or much strain and lateral stress.

The principal objects briefly stated of my invention, therefore are; first, to provide an anchorage which may be used to receive either a "slide" or a "catch" or "hook" coupling; second, to provide an anchorage wherein the elements designed to receive a slide coupling also form the web surrounding the opening adapted to receive a catch or hook coupling; third, to provide a coupling wherein the frame of the slide coupling elements also constitute the hook and guard of a catch coupling; fourth, to attain a positive lock irrespective the particular type of coupling used, and; fifth, to provide a coupling which may be used either as a "catch" or "slide" device without changing the normal relationship of its parts or the utilization of tools.

The structural elements employed to accomplish the above and other results and objects will be hereinafter more fully described in detail and specifically pointed out in the claims appended hereunto and forming a part of this specification.

In the accompanying drawings wherein is illustrated the preferred embodiment of my invention;—

Figure 2:
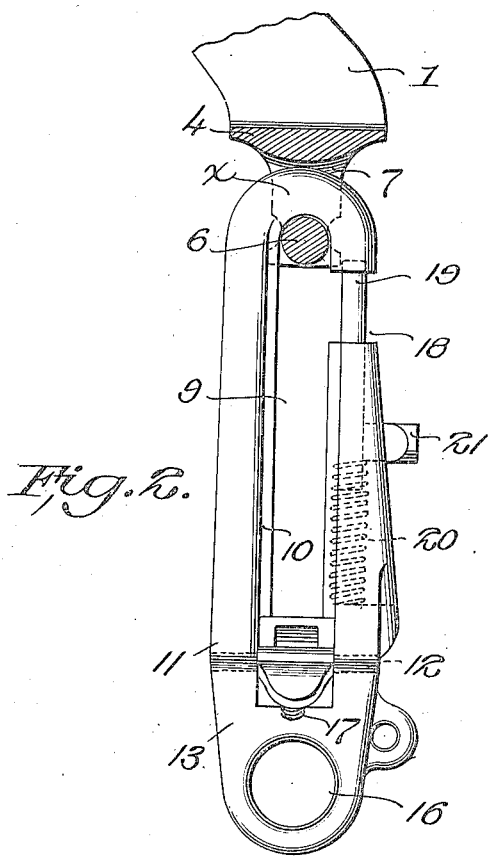
Figure 3:
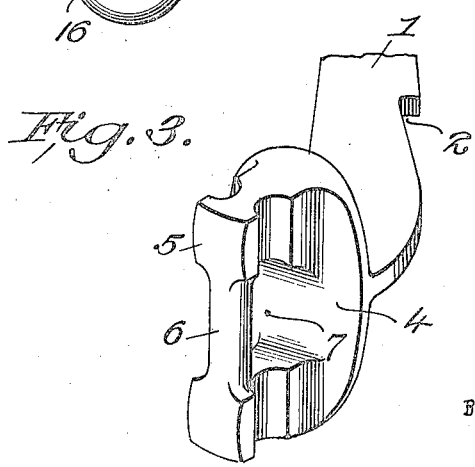
Figure 4:
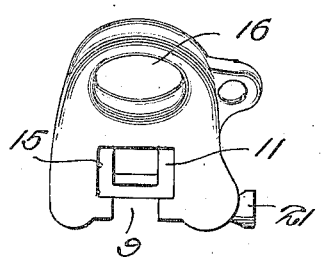

Figure 1, is a perspective view of my device when it is used as a "slide" coupling, Figure 2, is a side view of the device when it is used as a "catch" or "hook" coupling, Figure 3, is a perspective view of the anchoring element, Figure 4, is an end view of the coupling member.

Like characters of reference refer to like or similar parts throughout the several views of the drawings, in which:—

The numeral (1) designates the flat shank of my anchorage which has notched or serrated edges (2) and a terminal tenon (3). The shank is adapted to be imbedded in the masonry of a wall adjacent a window frame, with its head, generally designated by (4), extending outwardly from the wall and toward the window. Extending outwardly from, and formed integrally with the head (4) are a pair of spaced studs (5), the tops of which are integrally connected together by a reduced rib or web (6), between which, and the head (4), is an opening (7) adapted for the reception of a hooked terminal coupling. The studs, as will be seen upon inspection of Figure 3, are each formed with a reduced shank between the top and base thereof for receiving a "slide" coupling, such as will be hereinafter described.

Referring now to my coupling element, with particular emphasis upon the "slide" arrangement, it is pointed out that it comprises an elongated body, generally designated by (8), formed with a centrally located, longitudinal slot (9) which is open at one end to receive the tops of the studs (5) of the anchor. The material of the upper part of the body is cut away adjacent the slot to form a recess (10), the walls of which provide a track for the tops of the studs (5). The locking device used with my coupling contemplates a pawl (11) mounted upon a pin (12), which is journalled through the sides (13) of a support therefor formed integrally with the body (8). The support extends upwardly and rearwardly from the body and is cut away as at (15) to permit the tops of the studs (5) to pass thereunder. An eye (16) is also formed on the support to be engaged by a portion of the window washers' harness (not shown), and a coil spring (17) bearing against the pawl (11) causes the same to normally obstruct the track formed by the recess (10) and close the slot (9).

In order that my coupling may also be used as one of the "hook" or "catch" type, one side of the body is cut away rearwardly of the U-shaped end (X) thereof, as at (18), thus forming what may be termed a long or hooked side and end portion, and a short side portion serving as a guard for the hook. The short portion of the body adjacent the cut away portion (18) and opposite the hook (X) is provided with a central, longitudinal bore for receiving a pin (19), and the end of the long and hooked portion of the body is formed with a recess into which the free end of the pin (19) is normally kept seated by the coil spring (20). A finger button (21) for withdrawing the pin is mounted for movement in a slot (22) communicating with the bore. It will be seen from the foregoing that by withdrawing the pin (19) the U-shaped or hooked end (X) of the body may be inserted between the rib or web (6) and the head (4) of the opening (7) provided in the anchor to form a safe and effective "hook" or "catch" coupling.

In operation, when it is desired to use my coupling as a slide coupling, the tops of the studs (5) of the anchor are engaged within the slot (9), and the pawl is permitted to move, under the influence of the coil spring (17), to obstruct the slot and the track provided by the recess (10), so that accidental dislodgment of the coupling is positively prevented. When it is desired to use my device as a catch or hook coupling, the pin (19) is withdrawn and the U-shaped or hooked end (X) inserted between the rib or web (6) and the opening (7) formed in the head (4) of the anchor. Either method of attachment may be employed without any structural change in either the anchorage or the coupling, and without the use of tools. Particular attention is here invited to the compactness and simplicity of the device as a whole.

While in the foregoing, there has been illustrated and described such combination and arrangement of elements as constitute the preferred embodiment of my invention, it is nevertheless desired to emphasize the fact that interpretation of the invention should only be conclusive when made in the light of the subjoined claims.

Having described my invention and its objects with such attention to detail as will thoroughly acquaint one skilled in the art with its construction and advantages, I claim 1. A device of the character described comprising an anchorage formed with a head and a plurality of studs thereon, and means connecting the top portions of said studs and spaced from the head to form a receiving eye for a hooked coupling.

2. A device of the character described comprising an anchorage formed with an enlarged head, a plurality of spaced studs formed integrally upon the head, and the top portions of said studs being integrally connected together in spaced relationship to the head to provide a receiving eye for a hooked terminal.

3. A device of the character described comprising an anchorage formed with an enlarged head, a plurality of spaced studs formed integrally upon the head, the top portions for said studs being integrally connected together by a reduced web to provide a receiving eye for a hooked terminal, and the shank portions of the studs being reduced between the tops and bases thereof for receiving a slide coupling.

4. A device of the character described comprising a body formed with a medial slot and a cut-away portion communicating with the slot and interrupting the continuity of the body to provide a hooked terminal and a guard therefor, the portion of the body adjacent the slot being cut-away to form a recess for receiving a sliding anchorage, and spring means for closing the first named cut-away portion to lock an object within the hooked terminal.

5. A device of the character described comprising an elongated body formed with a centrally located slot and a lateral cut-away portion communicating with the slot and interrrupting the continuity of the body to form a hooked terminal and a guard therefor, the material of the body adjacent the slot being cut-away to form a recess for receiving a sliding anchorage, and means for closing the first-named cut-away portion to lock an object within the hooked terminal.

6. A device of the character described comprising a body provided with a centrally located slot, the material of the upper portion of the body adjacent the slot being cut away to form a recess for receiving a sliding anchorage for the body, and the body being further cut away to form a hook, the material of the body adjacent the last named cut away portion forming a guard for the hook, and means for locking an object within the hooked portion of the body.

7. In combination with an anchorage formed with a plurality of studs connected to provide an eye, a coupling therefor comprising a body formed with a slot for receiving the studs, and a hook for engaging the eye.

8. In combination with an anchorage formed with a plurality of studs having integrally connected tops forming an eye, a coupling therefor comprising a body formed with a slot for receiving the studs, and a cut-away portion communicating with the slot and interrupting the continuity of the body to provide a hook for engaging the eye.

9. In combination with an anchorage formed with an enlarged head and a plurality of studs having integrally connected tops forming an eye, a coupling therefor comprising an elongated body formed with a medial slot for receiving the studs, and a lateral cut-away portion communicating with the slot and interrupting the continuity of the body to provide a hook for engaging the eye.

In testimony whereof, I affix my signature hereto.

BENJAMIN KUGLER.